(12) United States Patent
Naka

(10) Patent No.: US 8,949,490 B2
(45) Date of Patent: Feb. 3, 2015

(54) DATA RECEPTION CIRCUIT, DATA RECEPTION APPARATUS, INFORMATION PROCESSING SYSTEM, AND DATA RECEPTION METHOD

(71) Applicant: Sony Corporation, Tokyo (JP)

(72) Inventor: Atsuhiro Naka, Kanagawa (JP)

(73) Assignee: Sony Corporation, Tokyo (JP)

( * ) Notice: Subject to any disclaimer, the term of this patent is extended or adjusted under 35 U.S.C. 154(b) by 23 days.

(21) Appl. No.: 13/768,493

(22) Filed: Feb. 15, 2013

(65) Prior Publication Data

US 2013/0235269 A1 Sep. 12, 2013

(30) Foreign Application Priority Data

Mar. 8, 2012 (JP) ................. 2012-051121

(51) Int. Cl.
*G06F 13/42* (2006.01)
*H04N 5/06* (2006.01)
*G09G 5/00* (2006.01)

(52) U.S. Cl.
CPC ................. *H04N 5/06* (2013.01); *G09G 5/006* (2013.01); *G09G 5/008* (2013.01); *G09G 2370/04* (2013.01); *G09G 2370/12* (2013.01)
USPC .................................. 710/51; 710/64; 710/58

(58) Field of Classification Search
None
See application file for complete search history.

(56) References Cited

PUBLICATIONS

"High-Definition Multimedia Interface Specification Version 1.3a," Nov. 10, 2006.

*Primary Examiner* — Jing-Yih Shyu
(74) *Attorney, Agent, or Firm* — Rader, Fishman & Grauer PLLC

(57) ABSTRACT

Disclosed herein is a data reception circuit including a clock generation block configured to divide a first clock based on clock information, the first clock being the clock of a transmission stream targeted to transmit video data between apparatuses, the clock information indicating a cyclical relationship between the first clock and a second clock serving as the clock of predetermined data, the clock generation block further outputting the divided clock as the second clock.

20 Claims, 10 Drawing Sheets

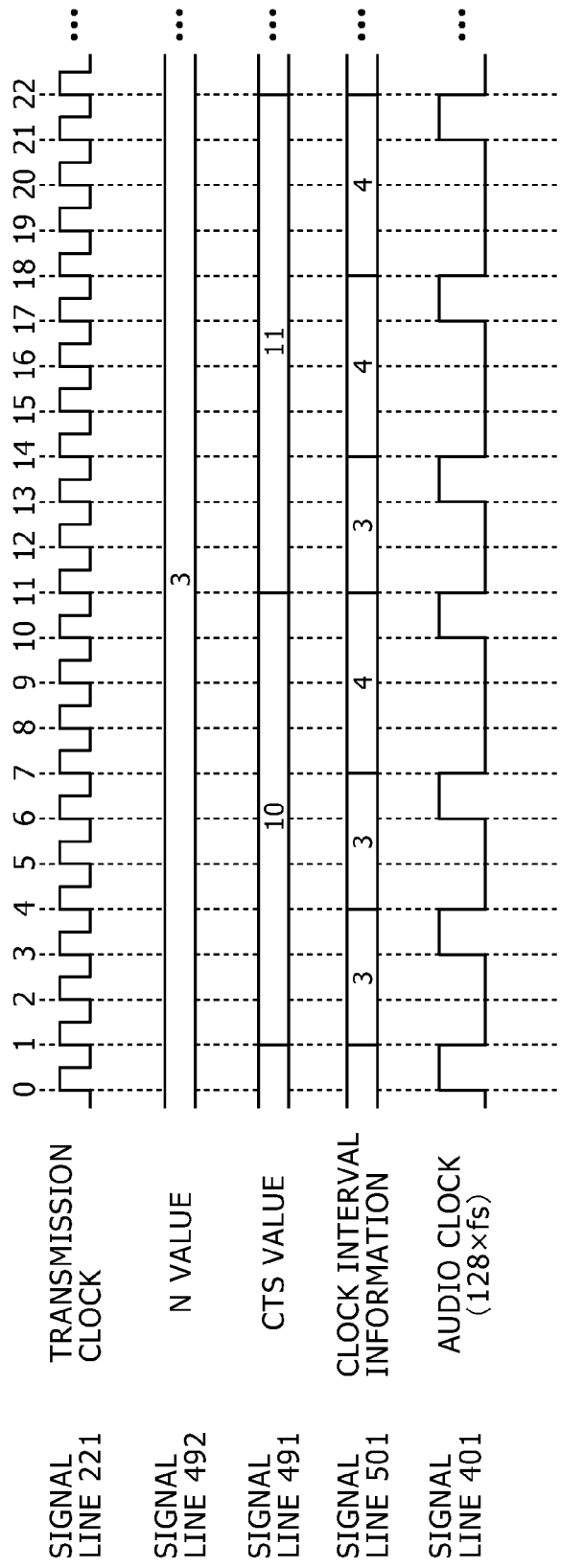

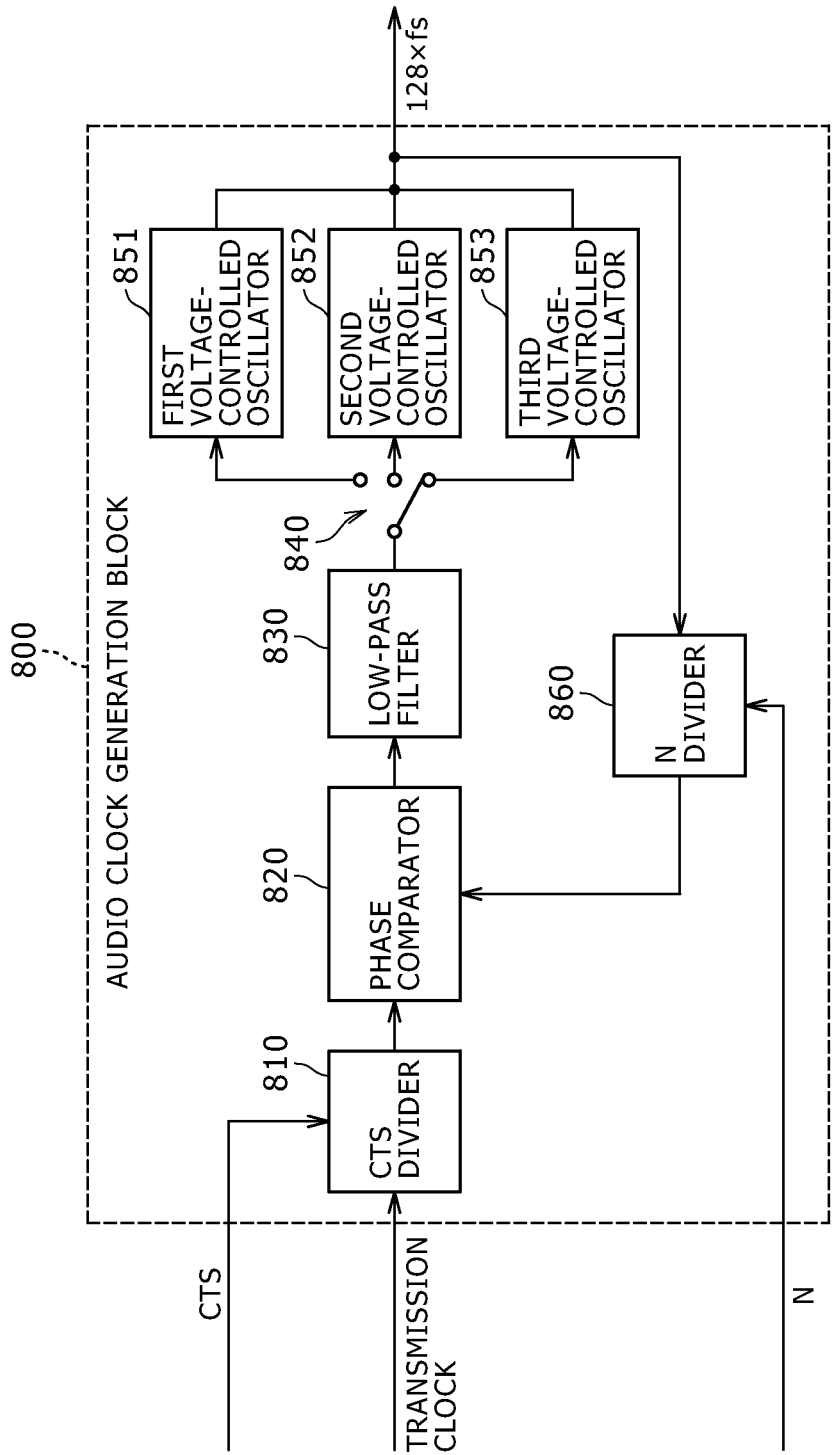

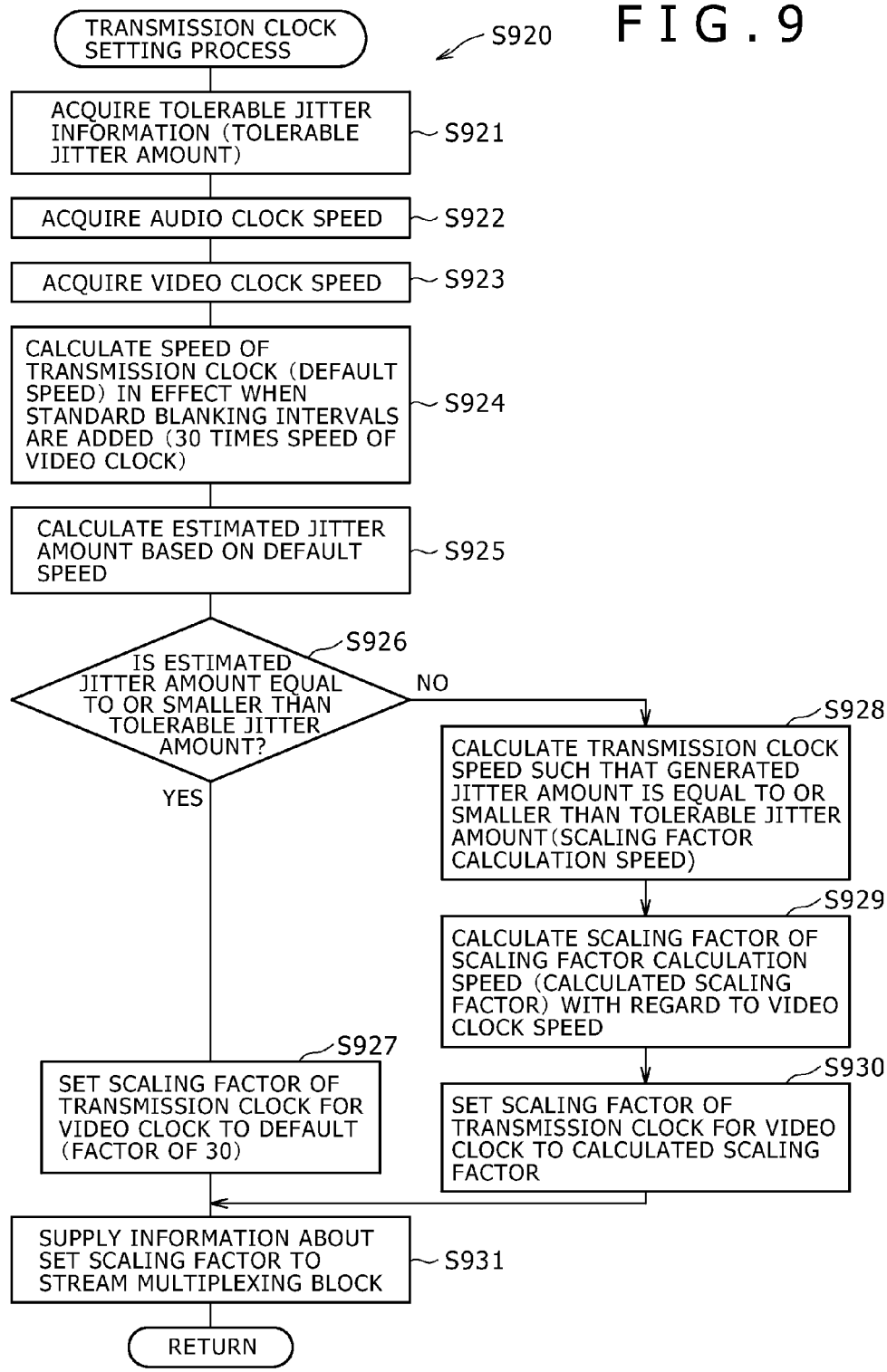

DATA RECEPTION CIRCUIT, DATA RECEPTION APPARATUS, INFORMATION PROCESSING SYSTEM, AND DATA RECEPTION METHOD

BACKGROUND

The present disclosure relates to a data reception circuit. More particularly, the disclosure relates to a data reception circuit, a data reception apparatus, an information processing system, and a data reception method involving the generation of a clock.

In recent years, there have been developed apparatuses for multiplexing audio data and video data (into a multiplexed stream) so as to reduce the number of routes necessary for transmitting audio data and video data between devices (transmission paths). For example, there have been developed apparatuses that transmit audio data and video data in accordance with the HDMI (High-Definition Multimedia Interface) standard (HDMI is a registered trademark; see "High-Definition Multimedia Interface Specification Version 1.3a," Nov. 10, 2006).

Data transmission according to the HDMI standard involves transmitting a multiplexed stream in synchronism with a video data clock (video clock). A device that transmits the multiplexed stream (source device) divides an audio data clock (audio clock) by a predetermined value (N value) to obtain the ratio between the divided clock and the video clock (CTS value) before transmitting these values (N value and CTS value) to a device that receives the multiplexed stream (sink device).

The sink device divides the video clock by the received CTS value and multiplies the divided clock by N to generate the audio clock.

SUMMARY

According to the related-art technique outlined above, the audio clock can be generated (regenerated) based on the video clock, N value, and CTS value transmitted to the sink device.

However, the above-outlined technique requires a PLL (phase locked loop) circuit that performs the process of multiplication by N. The use of the PLL circuit can lead to an increase in circuit scale and to higher manufacturing cost. In generating the audio clock, it is thus important to reduce the scale of the circuits for audio clock generation and thereby to facilitate clock generation.

The present disclosure has been made in view of the above circumstances and facilitates the generation of a clock.

According to one embodiment of the present disclosure, there are provided a data reception circuit and a data reception method, the data reception circuit including a clock generation block configured to divide a first clock based on clock information, the first clock being the clock of a transmission stream targeted to transmit video data between apparatuses, the clock information indicating a cyclical relationship between the first clock and a second clock serving as the clock of predetermined data, the clock generation block further outputting the divided clock as the second clock. This embodiment has the effect of generating the second clock by dividing the first clock based on the clock information.

As a variation of the above-outlined embodiment, the transmission stream may have the video data, the predetermined data, and the clock information multiplexed therein, the transmission stream being transmitted in synchronism with the first clock generated by amplifying by a predetermined scaling factor a clock for the transfer of the video data within an apparatus for transmitting the transmission stream. The data reception circuit may further include a demultiplexing block configured to demultiplex the transmission stream having been transmitted into the video data, the predetermined data, and the clock information. The clock generation block may generate the second clock by dividing the first clock based on the demultiplexed clock information. This variation has the effect of generating the second clock based on the clock of the transmission stream transmitted in synchronism with the clock for the transfer of the video data within the apparatus and on the clock information demultiplexed from the transmission stream.

As another variation of the above embodiment, the first clock may be the clock for transmitting the transmission stream using fewer transmission paths than the paths for the transfer of the video data within the apparatus for transmitting the transmission stream. This variation has the effect of generating the second clock based on the clock information as well as on the clock of the transmission stream transmitted using fewer transmission paths then the paths for the transfer of the video data within the apparatus for transmitting the transmission stream.

As a further variation of the above embodiment, the first clock may be the clock for transmitting the transmission stream using a single transmission path. This variation has the effect of generating the second clock based on the clock information as well as on the clock of the transmission stream transmitted using a single transmission path.

As an even further variation of the above embodiment, the predetermined scaling factor may be such as to make the amount of jitter included in the second clock smaller than a predetermined amount serving as a reference. This variation has the effect of generating the second clock based on the clock information as well as on the clock of the transmission stream transmitted using a clock making the amount of jigger smaller than the predetermined reference amount.

As a still further variation of the above embodiment, the clock information may include a CTS value and an N value, the CTS value indicating the clock number of the first clock corresponding to one clock cycle of the second clock having been divided into predetermined intervals, the N value indicating the predetermined interval. The clock generation block may generate the second clock by dividing the first clock based on the ratio between the CTS value and the N value. This variation has the effect of generating the second clock by dividing the transmission clock based on the ratio between the CTS value and the N value.

As a yet further variation of the above embodiment, the predetermined data may be audio data, and the second clock may be the master clock of the audio data. This variation has the effect of generating the master clock of the audio data by dividing the transmission clock.

As another variation of the above embodiment, the first clock may have a frequency at least 20 times that of the master clock of the audio data. This variation has the effect of generating an audio stream that can be reproduced.

According to another embodiment of the present disclosure, there is provided a data reception apparatus including: a first clock generation block configured to generate a first clock as the clock of a transmission stream transmitted via a single transmission path from a transmission apparatus transmitting video data to the data reception apparatus, the first clock being generated based on the transmission stream having been transmitted; a demultiplexing block configured to demultiplex the transmission stream having been transmitted into the video data, predetermined data, and clock information indicating a cyclical relationship between the first clock and a second clock serving as the clock of the predetermined data, and a clock generation block configured to divide the generated first clock based on the demultiplexed clock information, before outputting the divided clock as the second clock. This embodiment has the effect of generating the second clock by dividing the first clock based on the clock information.

According to a further embodiment of the present disclosure, there is provided an information processing system including: a data transmission apparatus configured to generate clock information indicating a cyclical relationship between a first clock as the clock of a transmission stream targeted to transmit video data between apparatuses and a second clock serving as the clock of predetermined data, before transmitting the transmission stream having the video data, the predetermined data, and the clock information multiplexed therein, and a data reception apparatus configured to receive the transmission stream having been transmitted and demultiplex the received transmission stream into the video data, the predetermined data, and the clock information, the data reception apparatus further dividing the first clock based on the clock information so as to generate the second clock. This embodiment has the effect of generating the second clock by dividing the first clock based on the clock information.

As a variation of the immediately preceding embodiment, the data transmission apparatus may calculate a scaling factor such as to make the amount of jitter included in the second clock generated by the data reception apparatus smaller than a predetermined amount serving as a reference, the data transmission apparatus further generating the first clock by amplifying by the calculated scaling factor a clock for the transfer of the video data within the data transmission apparatus. This variation has the effect of causing the data reception apparatus to generate the second clock containing a smaller amount of jitter than the predetermined reference amount.

As another variation of the immediately preceding embodiment, the data transmission apparatus may generate the transmission stream in such a manner that the rate of blanking intervals included in the transmission stream rise in proportion to an increase in the scaling factor. This variation has the effect of allowing the first clock to be raised and lowered in accordance with the increase and decrease in the size of the blanking intervals included in the transmission stream.

Thus the present disclosure embodied as outlined above provides the major effect of generating the clock easily.

BRIEF DESCRIPTION OF THE DRAWINGS

FIG. 3 is a timing chart schematically showing how an audio clock is generated by the audio clock generation block of the first embodiment;

FIGS. 4A and 4B are schematic views respectively showing an audio clock generation block (an audio clock generation circuit) of another sink device and a typical audio clock generation block of the first embodiment;

FIG. 9 is a flowchart showing the typical procedure of a transmission clock setting process performed by a transmission clock speed determination block of the second embodiment.

DETAILED DESCRIPTION OF THE PREFERRED EMBODIMENTS

Some preferred embodiments (simply called the embodiment hereunder where appropriate) for implementing the present disclosure are described below. The description will be given under the following headings:
1. First embodiment (data transfer control: an example in which the audio clock is generated without a PLL)
2. Second embodiment (data transfer control: an example of controlling jitter in the audio clock)<

1. First Embodiment

Typical Functional Structure of the Data Transmission System

Figure 1:
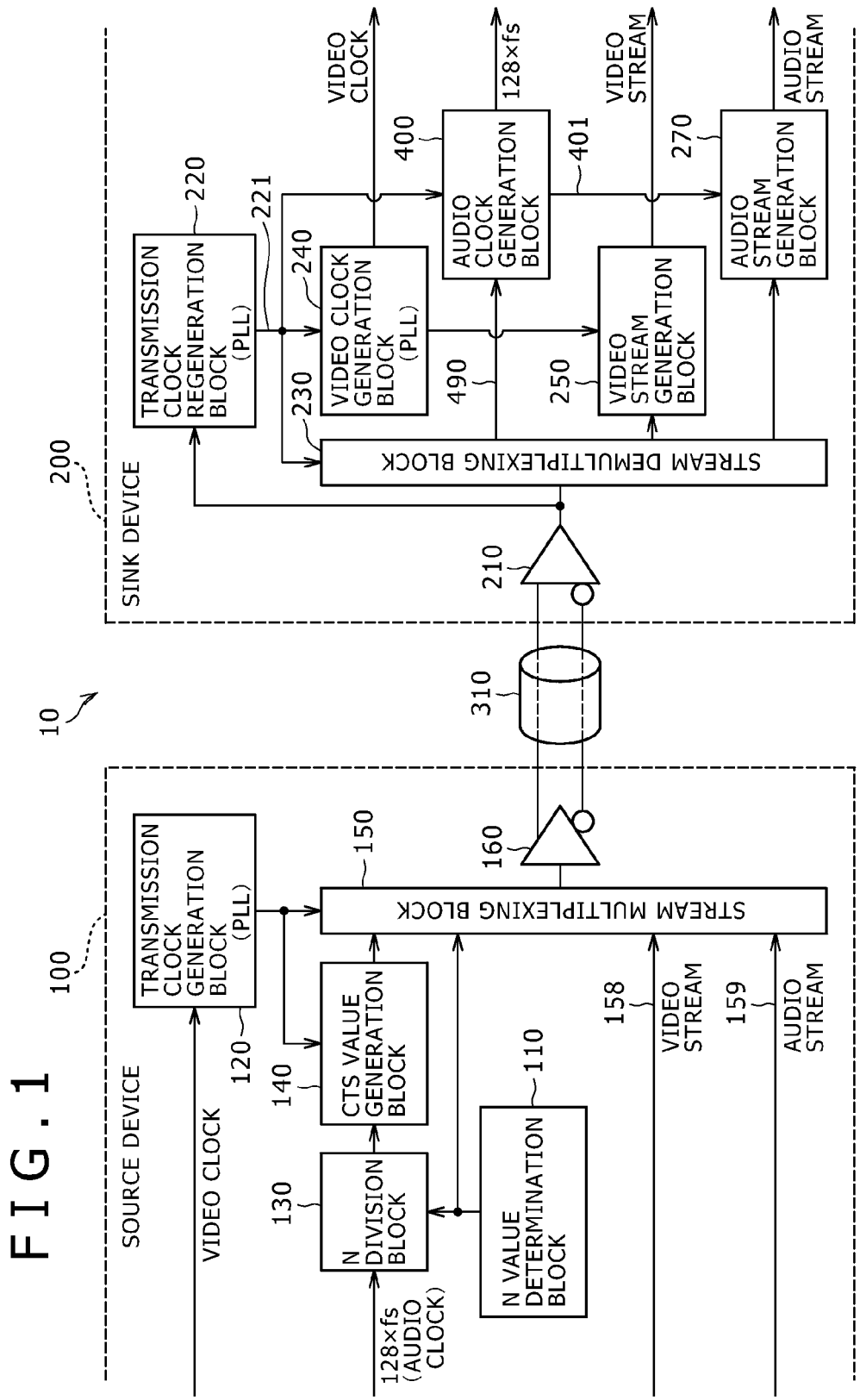
FIG. 1 is a schematic view showing a typical functional structure of a data transmission system as a first embodiment of the present disclosure.

FIG. 1 is a schematic view showing a typical functional structure of a data transmission system 10 as a first embodiment of the present disclosure.

In a data transmitting device (source device 100) and a data receiving device (sink device 200) of the data transmission system 10, only the structure of the function for the transfer of data is shown in FIG. 1, and the remaining structures are omitted from the figure.

The data transmission system 10 includes a source device 100, a sink device 200, and a transmission line 310 serving as the path over which data is transmitted from the source device 100 to the sink device 200. The transmission line 310 is composed of a pair of signal lines transmitting the data output by the source device 100 to the sink device 200.

The source device 100 multiplexes audio data and video data into a stream of data (multiplexed stream) and transmits the data to the sink device 200. The source device 100 includes an N value determination block 110, a transmission clock generation block (PLL: phase locked loop) 120, and an N division block 130. The source device 100 further includes a CTS (cycle time stamp) value generation block 140, a stream multiplexing block 150, and a differential driver 160.

The N value determination block 110 determines the value (N value) by which to divide the master clock for the audio clock generated by the source device 100. For purpose of explanation, the first embodiment assumes that the master clock for the audio clock is 128 times the sampling frequency (fs)(128×fs). The N value determination block 110 may typically determine the N value in the same manner that the N value is determined for the division of the audio clock according to the HDMI (High-Definition Multimedia Interface) standard. For example, the N value determination block 110 selects as the N value a value determined beforehand based on the relationship between the audio clock speed and the transmission clock speed. The N value determination block 110 supplies the N value thus determined to the N division block 130 and stream multiplexing block 150.

The N division block 130 divides the master clock for the audio clock (simply called the audio clock hereunder) by the N value, based on the N value supplied from the N value determination block 110. The N division block 130 supplies the clock generated through division (i.e., 1/N clock of the audio clock) to the CTS value generation block 140.

The transmission clock generation block (PLL) 120 generates the clock for transmitting the stream (transmission clock) from the source device 100 to the sink device 200 based on the video clock. For example, the transmission clock generation block 120 may be practiced using an ordinary PLL. The transmission clock generation block 120 may generate a clock at a speed, say, 30 times as high as that of the video clock, and supply the generated clock (transmission clock) to the CTS value generation block 140 and stream multiplexing block 150.

The CTS value generation block 140 generates the CTS value based on the clock fed from the N division block 130 (1/N audio clock) and on the transmission clock from the transmission clock generation block (PLL) 120. In this context, the CTS value is a value obtained by counting the cycle of the 1/N audio clock using the video clock.

That is, the relationship among the audio clock (S), transmission clock (T), and CTS value (CTS) is defined by the following expression (1):

$$S = T \times N / CTS \quad (1)$$

The N value and CTS value for the first embodiment are assumed to be substantially the same as those according to the HDMI standard. The CTS value generation block 140 supplies the generated CTS value to the stream multiplexing block 150.

The stream multiplexing block 150 generates the transmission stream by aligning the data to be transmitted to the sink device 200. For purpose of explanation, the first embodiment assumes that the video stream (video data stream) supplied via a signal line 158, audio stream (audio data stream) fed via a signal line 159, blank data, N value, and CTS value are multiplexed into the transmission stream.

Whereas the data structure of the multiplexed data (transmission stream) may be conceivably diverse, practically any such data structure may be applied to the first embodiment. For example, the typically applicable data structure may be one in which blanking intervals for accommodating added data are provided per frame, as in the data structures under the HDMI standard or SDI (Serial Digital Interface) standard. In this manner, the stream multiplexing block 150 multiplexes packetized audio data, N value, and CTS value into the blanking intervals of the transmission stream. The stream multiplexing block 150 supplies the generated transmission stream to the differential driver 160 using the transmission clock as a carrier.

The differential driver 160 generates differential signals for the serial transfer of the transmission stream from the stream multiplexing block 150 over a pair of signal lines (transmission line 310). The differential driver 160 generates a pair of signals (differential signals) in opposite phase to each other and supplies the generated signals to the sink device 200 via the transmission line 310. In this manner, the first embodiment transmits the transmission stream to the sink device 200 via a single transmission path.

Although the example of having data transmitted over a single transmission path between devices is explained here in connection with the first embodiment, this is not limitative of the present disclosure. The transmission stream need only be transmitted in synchronism with a high-speed transmission clock. That is, when the transmission stream is transmitted using fewer transmission paths (one transmission path for the first embodiment) than the paths for the transfer of video data within the apparatus, the transmission clock is likewise made high in speed for the transmission. For example, where the video stream is handled by a 24-bit parallel transfer (with 24 paths) within the source device 100, the transmission clock for one-path transmission has a speed at least 24 times that of the video clock. In the case of a four-path transmission setup, the transmission clock is at least six times as high in speed for the transmission.

The sink device 200 is designed to receive the transmission stream supplied from the source device 100. As such, the sink device 200 includes a differential receiver 210, a transmission clock regeneration block (PLL) 220, a stream demultiplexing block 230, and a video clock generation block (PLL) 240. The sink device 200 further includes a video stream generation block 250, an audio stream generation block 270, and an audio clock generation block 400.

The differential receiver 210 is designed to receive the transmission stream supplied via the transmission line 310. The differential receiver 210 receives the differential signals sent from the differential driver 160 and supplies the transmission stream to the transmission clock regeneration block (PLL) 220 and stream demultiplexing block 230.

Based on the transmission stream supplied from the differential receiver 210, the transmission clock regeneration block (PLL) 220 regenerates the clock of the supplied transmission stream (transmission clock). That is, the transmission clock regeneration block (PLL) 220 regenerates the clock of the same frequency as that of the clock (transmission clock) generated by the transmission clock generation block (PLL) 120. For example, the transmission clock regeneration block (PLL) 220 may be practiced using a common PLL. The transmission clock regeneration block (PLL) 220 supplies the regenerated transmission clock to the stream demultiplexing block 230, to the video clock generation block (PLL) 240, and to the audio clock generation block 400 via a signal line 221. Incidentally, the transmission clock regeneration block (PLL) 220 is an example of the first clock generation block described in the appended claims.

The stream demultiplexing block 230 demultiplexes the transmission stream into the original data (video data, audio data, N value, and CTS value). The stream demultiplexing block 230 supplies the video data demultiplexed out of the transmission stream to the video stream generation block 250 and the audio data out of the transmission stream to the audio stream generation block 270. Also, the stream demultiplexing block 230 supplies the N value and CTS value demultiplexed from the transmission stream to the audio clock generation block 400 via a signal line 490.

The video clock generation block (PLL) 240 generates the video clock based on the transmission clock supplied from the transmission clock regeneration block (PLL) 220. For example, the video clock generation block (PLL) 240 may be practiced using a common PLL. The video clock generation block (PLL) 240 supplies the generated video clock to the video stream generation block 250 and to circuits (not shown) that use the video clock within the sink device 200.

The video stream generation block 250 generates the video stream based on the video data supplied from the stream demultiplexing block 230 and on the video clock fed from the video clock generation block (PLL) 240. The video stream generated by the video stream generation block 250 is supplied to the circuits that use the video stream within the sink device 200.

The audio clock generation block 400 generates the audio clock based on the transmission clock supplied from the transmission clock regeneration block (PLL) 220 and on the N value and CTS value fed from the stream demultiplexing block 230. The audio clock generation block 400 generates the audio clock by dividing the transmission clock based on the N value and CTS value. It should be noted that the audio clock generation block 400 is practiced without using the PLL. The audio clock generation block 400 will not be discussed further here; it will be explained later in detail in reference to FIG. 2. The audio clock generation block 400 supplies the generated audio clock to the audio stream generation block 270 and to the circuits (not shown) that use the audio clock within the sink device 200. Incidentally, the audio clock generation block 400 is an example of the clock generation block described in the appended claims.

The audio stream generation block 270 generates the audio stream based on the audio stream supplied from the stream demultiplexing block 230 and on the audio clock fed from the audio clock generation block 400. The audio stream generated by the audio stream generation block 270 is supplied to the circuits that use the audio stream within the sink device 200.

The audio clock generation block 400 is explained below in reference to FIG. 2.

[Typical Functional Structure of the Audio Clock Generation Block]

Figure 2:
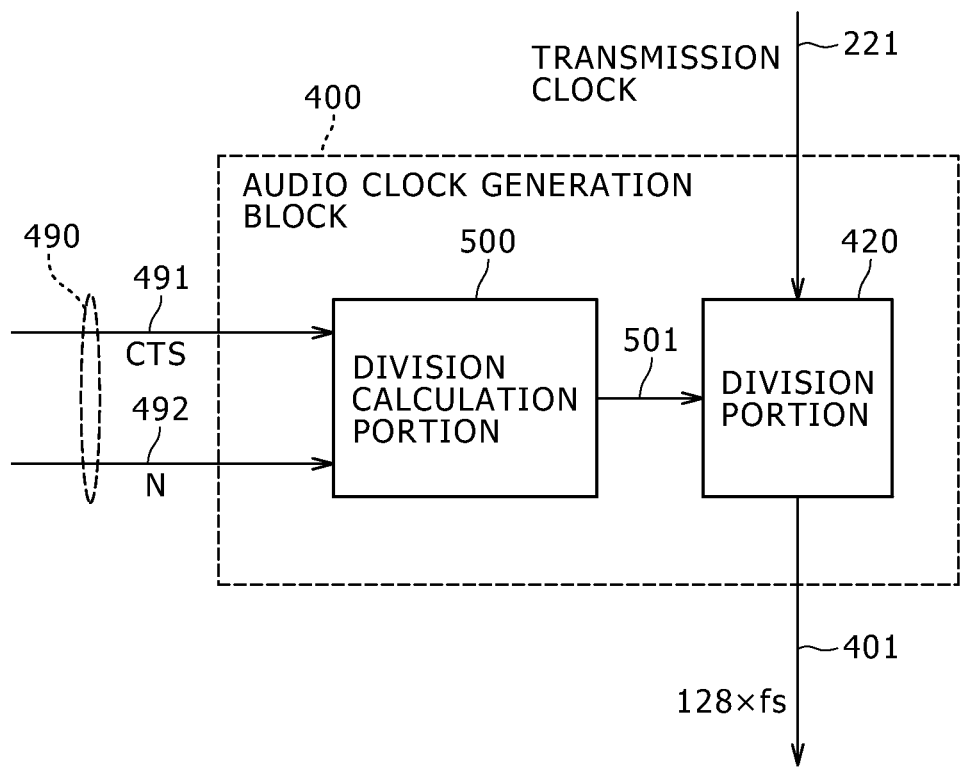
FIG. 2 is a schematic view showing a typical functional structure of an audio clock generation block of the first embodiment.

FIG. 2 is a schematic view showing a typical functional structure of the audio clock generation block 400 of the first embodiment of the present disclosure.

The audio clock generation block 400 is designed to generate the audio clock. As such, the audio clock generation block 400 includes a division calculation portion 500 and a division portion 420.

The division calculation portion 500 calculates information indicative of the transmission clock number corresponding to one clock cycle of the audio clock (the information is called the clock interval hereunder), based on the CTS value supplied from the stream demultiplexing block 230 via the signal line 490 (via a signal line 491 constituting part of the signal line 490) and on the N value fed from the block 230 also via the signal line 490 (via a signal line 492 making up part of the signal line 490). The clock interval calculated by the division calculation portion 500 is a value that indicates the pulse rise timing of the audio clock in terms of the clock number of the transmission clock, for example. No example of having the clock interval calculated will be discussed here; one such example will be explained later in reference to FIG. 3. The division calculation portion 500 supplies the information indicative of the calculated clock interval (clock interval information) to the division portion 420.

The division portion 420 divides the transmission clock supplied from the transmission clock regeneration block (PLL) 220 based on the clock interval information fed from the division calculation portion 500. The division portion 420 generates the audio clock by raising the audio clock pulse at intervals of the clock number of the transmission clock indicated by the clock interval information.

Explained next in reference to FIG. 3 is how the audio clock is typically generated through division by the division calculation portion 500 and division portion 420, the division being assumed to be performed using a non-integer.

[Typical Division by Use of a Non-Integer]

FIG. 3 is a timing chart schematically showing how the audio clock is generated by the audio clock generation block 400 of the first embodiment of the present disclosure.

FIG. 3 indicates three signals (transmission clock, N value, and CTS value) supplied to the audio clock generation block 400, the clock interval information generated by the division calculation portion 500, and the audio clock generated by the division portion 420. In the ensuing description, the transmission clock will be explained in conjunction with times "0" through "22."

Also in FIG. 3, the value "3" is assumed to be set to the N value for purpose of explanation. It is further assumed for explanation purposes that a CTS value of "10" is supplied at time "1" and a CTS value of "11" is fed at time "11."

When a new CTS value is supplied at time "1" to the division calculation portion 500, the division calculation portion 500 calculates the clock interval based on the N value and on the newly supplied CTS value. For example, the division calculation portion 500 may calculate the clock interval using the following expression (2):

$$A/N = q \text{ remainder } r \quad (2)$$

where, reference character A stands for a value obtained by adding to the CTS value the remainder from the preceding calculation of the clock interval; reference character N denotes the N value; reference character q represents the quotient from the division on the left-hand side, and reference character r indicates the remainder from the division on the left-hand side. The quotient q is the value of the clock interval information supplied from the division calculation portion 500 to the division portion 420.

The expression (2) above is explained here. When supplied with a new CTS value, the division calculation portion 500 sets the CTS value to the value A (remainder is 0) and calculates the clock interval using the expression (2). That is, at time "1," the quotient q is calculated to be "3" and the remainder to be "1" (10/3=3 remainder 1). And the division calculation portion 500 determines the quotient q of "3" to be the clock interval and supplies the division portion 420 with the clock interval information indicating that the clock interval is "3." The division calculation portion 500 then waits for an audio clock pulse to rise.

Later at time "3," an audio clock pulse rises. This generates one clock cycle of the audio clock.

Then at time "4," the division calculation portion 500 again calculates the clock interval. For this calculation, the value A is set to a value of "11" obtained by adding the remainder "1" from time "1" to the CTS value "10." As a result, the quotient q is calculated to be "3" and the remainder r to be "2" at time "4." The division calculation portion 500 supplies the division portion 420 with the clock interval information indicating that the clock interval is "3."

Later at time "6," another audio clock pulse rises.

Then at time "7," the division calculation portion 500 again calculates the clock interval. For this calculation, the value A is set to a value of "11" obtained by adding the remainder "2" from time "4" to the CTS value "10." As a result, the quotient q is calculated to be "4" and the remainder r to be "0" at time "7." The division calculation portion 500 supplies the division portion 420 with the clock interval information indicating that the clock interval is "4."

Later at time "10," another audio clock pulse rises in the division portion 420.

Then at time "11," the division calculation portion 500 again calculates the clock interval. Since the remainder r became "0" in the calculation at time "7," the division calculation portion 500 updates the CTS value for use in updating the value A. In the timing chart of FIG. 3, the CTS value is shown updated to "11" at time "11," so that the division calculation portion 500 sets the value "11" to the value A. As a result, the quotient q is calculated to be "3" and the remainder r to be "2" at time "11" (11/3=3 remainder 2), and the clock interval "3" is set.

Later at time "13," another audio clock pulse rises.

Then at time "14," a value of "13 (11+2)" is set to the value A in the clock interval calculation. The quotient q is calculated to be "4" and the remainder r to be "1" (13/3=4 remainder 1), and the clock interval "4" is set.

Later at time "17," another audio clock pulse rises.

Then at time "18," a value of "12 (11+1)" is set to the value A in the clock interval calculation. The quotient q is calculated to be "4" and the remainder r to be "0" (12/3=4 remainder 0), and the clock interval "4" is set.

When the CTS value and N value are used to calculate the clock interval as the transmission clock number corresponding to one clock cycle of the audio clock as explained above, it is possible to generate (regenerate) the audio clock without using the PLL.

For the case in FIG. 3, it is assumed that the division ratio is a non-integer. Where the division ratio is a non-integer, the clock interval fluctuates (e.g., from "3" to "4") and thereby produces jitter in the generated clock. On the other hand, where the division ratio is an integer, jitter is not produced.

What follows is an explanation of the relationship between the audio clock generated by the audio clock generation block 400 and jitter. The CTS value is generated at intervals of the audio clock divided by N (see the N division block 130 and CTS value generation block 140 in FIG. 1), and varies from one clock cycle to another. When the CTS value thus varies from one clock cycle to another, it is difficult to fix the division ratio to an integer during audio clock generation by the audio clock generation block 400. The inclusion of jitter in the audio clock is unavoidable because of the division ratio being a non-integer. However, jitter can be minimized through the division involving a raised frequency ratio between the clock of the clock source (transmission clock) and the generated clock (audio clock).

Below is an explanation of the relationship between the frequency of the clock source and the jitter of the clock generated by division.

If it is assumed that a clock of 10 MHz is generated from a clock source of 100 MHz (through division of approximately 1/10), the change in frequency due to a shift of one clock cycle in the clock interval is as follows:
11.111 ... MHz (100/9) when the clock interval is "9";
10.000 MHz (100/10) when the clock interval is "10,"; and
9.090 ... MHz (100/11) when the clock interval is "11." As indicated above, where the clock of 10 MHz is generated from the clock source of 100 MHz, the change in frequency due to the shift of one clock cycle in the clock interval is approximately 1 MHz. That is, when the clock of 10 MHz is generated from the clock source of 100 MHz, the resolution (accuracy) of division by non-integer is approximately 1 MHz.

In another example where a clock of 10 MHz is generated from a clock source of 1000 MHz, the change in frequency due to a shift of one clock cycle in the clock interval is as follows:
10.101 ... MHz (1000/99) when the clock interval is "99";
10.000 MHz (1000/100) when the clock interval is "100,"; and
9.901 ... MHz (1000/101) when the clock interval is "101." As indicated above, where the clock of 10 MHz is generated from the clock source of 1000 MHz, the change in frequency due to the shift of one cycle in the clock interval is approximately 0.1 MHz. That is, when the clock of 10 MHz is generated from the clock source of 1000 MHz, the resolution (accuracy) of division by non-integer is approximately 0.1 MHz, which is 10 times as high as when the clock source is 100 MHz.

As is evident from above, the amount of jitter is made smaller the higher the frequency ratio between the clock of the clock source (transmission clock) and the generated clock (audio clock).

For example, if a clock 128 times as high as the sampling frequency (fs) of 96 kHz is to be generated on the assumption that the transmission stream is transmitted at a speed of 1 Gbps (1 GHz), the frequency ratio is 1,000,000 kHz:12,288 (96×128) kHz. That is, division can be made using a frequency ratio of about 83 to 1. It is assumed here that the audio clock tolerates jitter of up to five percent (i.e., clock with a frequency of within plus or minus five percent of the target frequency). (The five percent is the allowable limit of jitter under the SPDIF standard (IEC 60958-1).) Since the frequency ratio of which the jitter is up to 5 percent is 20 to 1, the division using the frequency ratio of about 83 to 1 easily falls within the allowable limit.

In the data transmission system 10 as the first embodiment of this disclosure, data is transferred using differential signals over a single path, so that data transmission is accomplished at a high speed. That is, in the data transmission system 10 of the first embodiment of the present disclosure, the transmission clock serving as the clock source offers a high frequency, so that the audio clock generation block 400 can generate a practicable audio clock without using the PLL.

[Typical Effects]

Figure 4B:
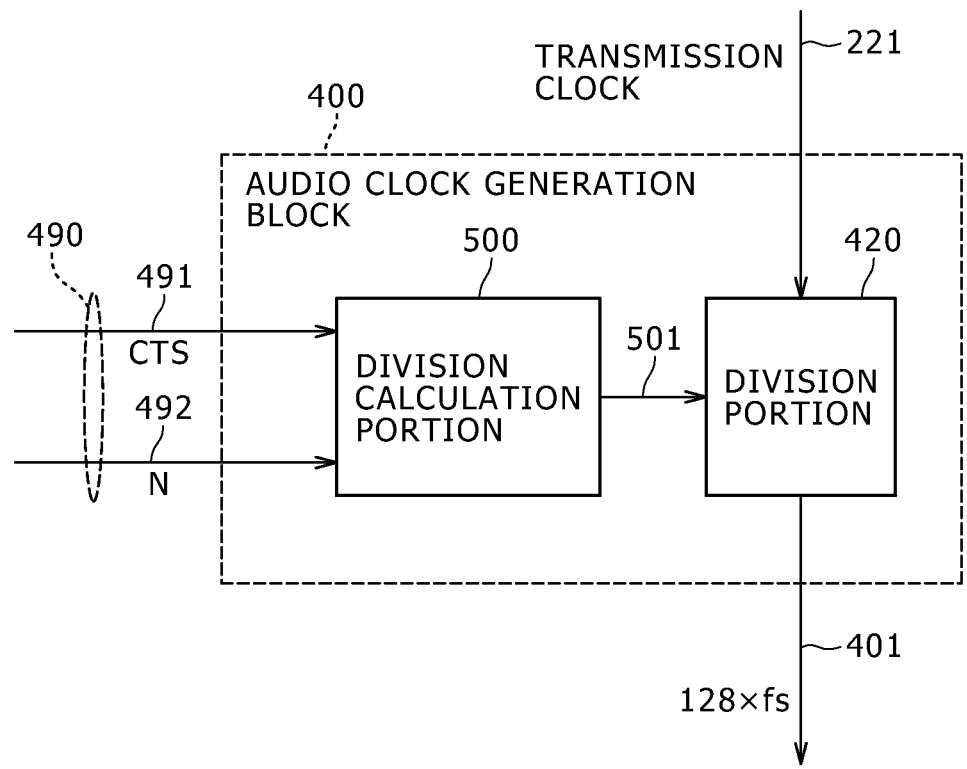

FIGS. 4A and 4B are schematic views showing a typical audio clock generation block 400 of the first embodiment of the present disclosure and an audio clock generation block of another sink device (audio clock generation circuit 800).

FIG. 4A shows a typical audio clock generation circuit 800 of another sink device. This audio clock generation circuit 800 includes a CTS divider 810, a phase comparator 820, a low-pass filter 830, a switch 840, a first voltage-controlled oscillator 851 through a third voltage-controlled oscillator 853, and an N divider 860.

The CTS divider 810 divides the clock of the clock source (transmission clock) by the CTS value, and supplies the divided clock to the phase comparator 820.

The phase comparator 820, low-pass filter 830, switch 840, the first through the third voltage-controlled oscillators 851 through 853, and N divider 860 make up a PLL circuit. Because the audio clock is on a wideband (e.g., it varies between about 1 MHz and about 50 MHz), FIG. 4A shows an example in which one of a plurality of voltage-controlled oscillators (VCO) suitable for the band currently in effect is selectively used.

The functional structure constituting the PLL circuit (including the phase comparator 820, low-pass filter 830, switch 840, the first through the third voltage-controlled oscillator 851 through 853, and N divider 860) will not be discussed further in detail.

Where the audio clock is generated using the PLL circuit as shown in FIG. 4A, a plurality of voltage-controlled oscillators (VCO) are required. This requirement tends to enlarge the scale of the circuit. It is also necessary to adjust the voltage-controlled oscillators in the stage of circuit manufacturing. These factors may well combine to boost costs where the audio clock generation circuit 800 is structured using the PLL circuit.

FIG. 4B shows the audio clock generation block 400 of the first embodiment of the present disclosure. The audio clock generation clock 400 in FIG. 4B is the same as that shown in FIG. 2 and thus will not be discussed further.

As shown in FIG. 4B, the first embodiment of this disclosure generates the audio clock without using the PLL. Compared with the case where the PLL circuit is used, the first embodiment offers a reduced scale of circuitry. With the scale of circuitry reduced, it is possible to lower power dissipation. Since there also is no need to adjust the voltage-controlled oscillators (VCO), the circuit can be manufactured at low cost. Because work to make the adjustments per product is not needed, costs are that much lowered and variations in performance are reduced as well.

[Typical Operation of the Audio Clock Generation Block]

Explained below in reference to the accompanying drawings is how the audio clock generation block 400 of the first embodiment typically operates.

Figure 5:
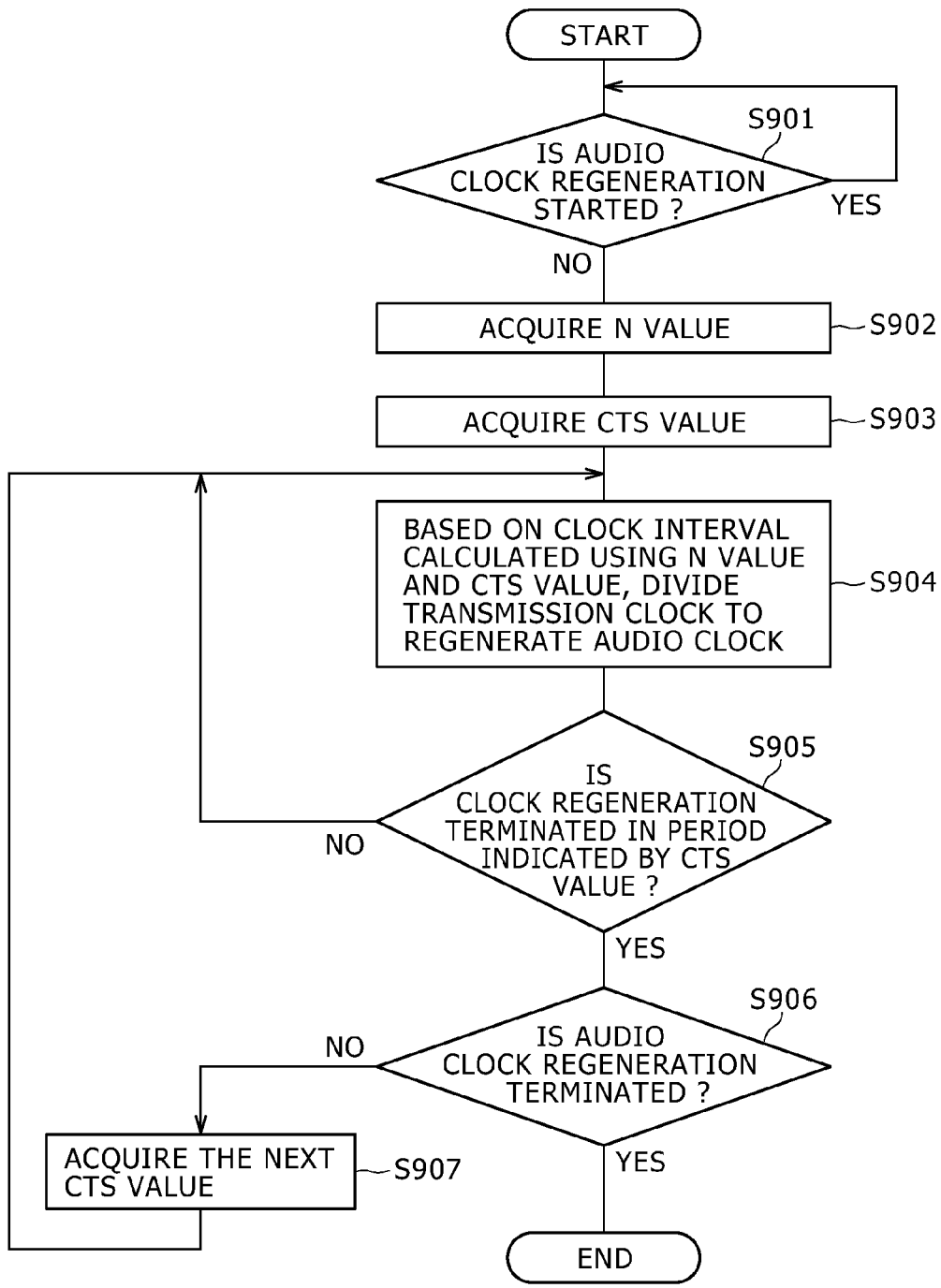
FIG. 5 is a flowchart showing a typical procedure by which the audio clock generation block of the first embodiment regenerates the audio clock.

FIG. 5 is a flowchart showing a typical procedure by which the audio clock generation block 400 of the first embodiment regenerates (generates) the audio clock.

First, it is determined whether or not to start audio clock regeneration (step S901). If it is determined not to start regenerating the audio clock, the procedure of audio clock generation is put on hold. For example, if the transmission stream is received and if audio data is detected to be included in the received transmission stream, the control block (not shown) of the sink device 200 determines that regeneration of the audio clock is to be started.

If it is determined to start audio clock regeneration (step S901), the audio clock generation block 400 acquires the N value demultiplexed from the transmission stream by the stream demultiplexing block 230 (step S902). The CTS value is then demultiplexed from the transmission stream and supplied to the audio clock generation block 400. The audio clock generation block 400 acquires the CTS value in this manner (step S903).

Based on the clock interval calculated from the N value and CTS value, the audio clock generation block 400 divides the transmission clock to regenerate the audio clock (step S904). Incidentally, step S904 is an example of the clock generating step described in the appended claims.

The audio clock generation block 400 then determines (step S905) whether or not regeneration of the audio clock is terminated in the period indicated by the CTS value used to calculate the clock interval in step S904 (the period corresponds to one clock cycle of 1/N audio clock). If it is determined that regeneration of the audio clock has yet to be terminated in the period indicated by the CTS value (step S905), step S904 is reached again and regeneration of the audio clock is continued.

On the other hand, if it is determined that regeneration of the audio clock is terminated in the period indicated by the CTS value (step S905), then it is determined whether or not to terminate audio clock regeneration (step S906). If it is determined that regeneration of the audio clock is to be terminated (e.g., when transmission of the transmission stream comes to an end), the audio clock regeneration process is brought to an end.

According to the first embodiment, as explained above, the audio clock may be generated easily by dividing a high-frequency transmission clock using the N value and CTS value.

2. Second Embodiment

For the first embodiment, it was assumed that the transmission clock generation block (PLL) 120 generates the transmission clock 30 times as fast as the video clock. This makes it possible to provide blanking intervals whose size conforms to the image data size of each frame with regard to each frame of the data structure in the transmission stream.

However, because the transmission clock is determined in keeping with the speed of the video clock, the relationship between the video clock speed and the audio clock speed determines the accuracy of the clock to be generated by the audio clock generation block 400. That is, if the video clock is slow, so is the transmission clock to be generated. This, as explained above in reference to FIG. 3, can worsen the accuracy in generating the audio clock.

For example, where the frame (image) size is small or where the frame rate is low, the amount of video data per unit time is small. This leads to a slow video clock. Meanwhile, since audio data is irrelevant to the increase and decrease of video data, the audio data remains fast even when the video clock becomes slower. This leads to a reduced ratio between the transmission clock (30 times the video clock) and the audio data. As a result, the accuracy in generating the audio clock is worsened. Thus with the first embodiment of the present disclosure, the smaller the amount of video data per unit time, the lower the accuracy can become in generating the audio clock.

In view of the above circumstances, the second embodiment of the present disclosure aims to adjust the size of the blanking intervals in the transmission stream generated by the source device so as to enhance the accuracy of the audio clock to be generated by the sink device. An example of how the adjustment is made is explained below in reference to FIGS. 6 through 9.

[Typical Functional Structure of the Data Transmission System]

Figure 6:
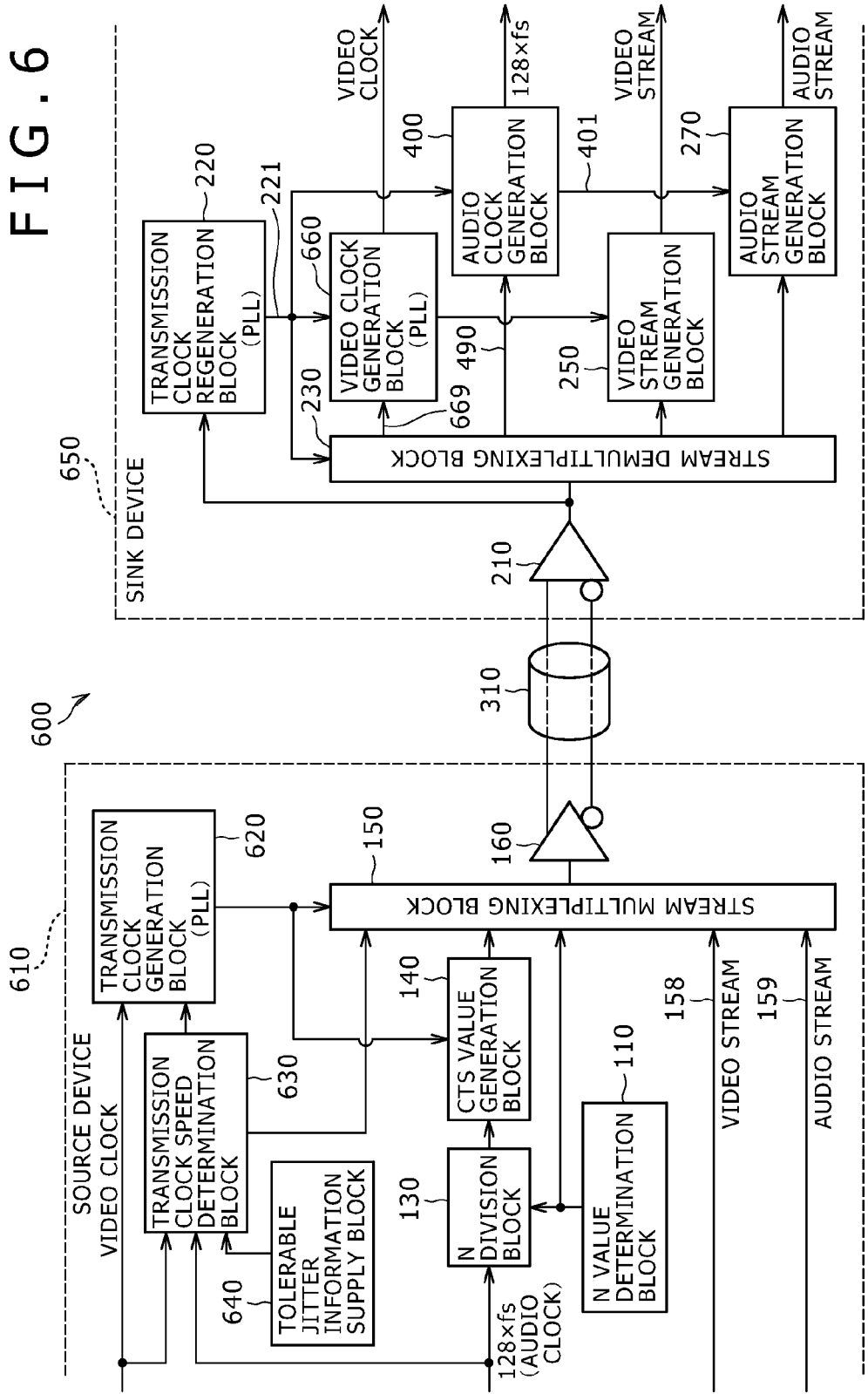
FIG. 6 is a schematic view showing a typical functional structure of a data transmission system as a second embodiment of the present disclosure.

FIG. 6 is a schematic view showing a typical functional structure of a data transmission system 600 as the second embodiment of the present disclosure.

The data transmission system 600 shown in FIG. 6 is a variation of the data transmission system 10 indicated in FIG. 1. The data transmission system 600 includes a source device 610 made by supplementing the source device 100 in FIG. 1 with a structure for determining the transmission clock. The data transmission system 600 also includes a sink device 650 made by supplementing the sink device 200 in FIG. 1 with the function of generating the video clock in a manner reflecting the transmission clock speed determined by the source device 610.

The source device 610 includes an N value determination block 110, an N division block 130, a CTS value generation block 140, a stream multiplexing block 150, a differential driver 160, a tolerable jitter information supply block 640, a transmission clock speed determination block 630, and a transmission clock generation block (PLL) 620.

The N value determination block 110, N division block 130, CTS value generation block 140, stream multiplexing block 150, and differential driver 160 are substantially the same in structure as their counterparts shown in FIG. 1 and thus will not be explained further. Also, the transmission clock generation block (PLL) 620 is the same as the transmission clock generation block (PLL) 120 shown in FIG. 1 except that the block 620 can vary the scaling factor of the transmission clock with regard to the video clock, and thus will not be discussed here.

The sink device 650 has a video clock generation block (PLL) 660 replacing the video clock generation block (PLL) 240 of the sink device 200 shown in FIG. 1. The video clock generation block (PLL) 660 is the same as the video clock generation block (PLL) 240 except that the block 660 can vary the ratio between the transmission clock and the video clock in keeping with the information about the scaling factor supplied from the stream demultiplexing block 230 via a signal line 669. Also, the sink device 650 has the same structure as the sink device 200 in FIG. 1 except for the video clock generation block (PLL) 660, and thus will not be discussed here.

The tolerable jitter information supply block 640 supplies the transmission clock speed determination block 630 with information (tolerable jitter information) indicating the upper limit (tolerance) of the jitter included in the audio clock to be generated (regenerated) by the sink device 650. While the degree of jitter may conceivably be expressed in a number of ways, the second embodiment assumes that jitter is expressed in percentage (%) as in the case of the first embodiment of the present disclosure. For the second embodiment of the present disclosure, it is assumed for explanation purposes that five percent is the allowable limit of jitter as in the case of the first embodiment and that the value of five percent is set as the jitter information.

Although the second embodiment of this disclosure assumes that the tolerable jitter information is a fixed value, the information may be set variably depending on the user's input with regard to audio quality, for example. It is also conceivable that the tolerable jitter information is set in accordance with information supplied from the sink device 650 concerning itself (e.g., performance of the audio function of the sink device 650).

The transmission clock speed determination block 630 is designed to determine the speed of the transmission clock based on the tolerable jitter information, video clock, and audio clock. The transmission clock speed determination block 630 determines the transmission clock speed in such a manner that the jigger in the audio clock generated by the audio clock generation block 400 of the sink device 650 falls within the limit (5%) indicated by the tolerable jitter information.

Explained below is the transmission clock speed determined by the transmission clock speed determination block 630. It is assumed that the blanking intervals involved have a standard size (i.e., of minimum blanking intervals). The standard blanking interval size (standard size) is further assumed to be the size of the blanking intervals provided by the first embodiment of this disclosure. That is, the clock of the transmission stream generated when the standard-size blanking intervals are provided is 30 times as fast as the video clock.

The transmission clock speed determination block 630 first calculates the speed of the transmission clock generated by amplifying the video clock by a factor of 30 (standard scaling factor). Based on the calculated speed of the transmission clock and on the audio clock, the transmission clock speed determination block 630 estimates the amount of jitter (estimated jitter amount) generated when the audio clock generation block 400 regenerates the audio clock. If a comparison between the estimated jitter amount and the jitter amount indicated by the tolerable jitter information (tolerable jitter amount) reveals that the estimated jitter amount is equal to or smaller than the tolerable jitter amount, it is determined to generate the transmission clock by amplifying the video clock by a factor of 30. On the other hand, if the estimated jitter amount is larger than the tolerable jitter amount, then the speed of the transmission clock is calculated in such a manner that the estimated jitter amount falls within the tolerable jitter amount. The scaling factor for use in generating the transmission clock is then determined so that at least the calculated transmission clock speed may be attained. The transmission clock speed determination block 630 then supplies information about the determined scaling factor to the transmission clock generation block (PLL) 620 so that the block 620 may determine the scaling factor by which to amplify the clock.

The determined scaling factor is supplied to the stream multiplexing block 150 whereby the scaling factor is multiplexed into the transmission stream and fed to the sink device 650. In the sink device 650, the determined scaling factor is forwarded from the stream demultiplexing block 230 to the video clock generation block (PLL) 660 via a signal line 669. The scaling factor is used as information for regenerating the video clock (i.e., ratio of the video clock to the transmission clock).

The transmission clock speed determination block 630 supplies the stream multiplexing block 150 with information about the blanking interval size set by the determined scaling factor (transmission clock speed). In turn, the stream multiplexing block 150 generates the transmission stream that includes the blanking intervals of that size.

[Typical Data Structures of the Transmission Stream]

Figure 7A:
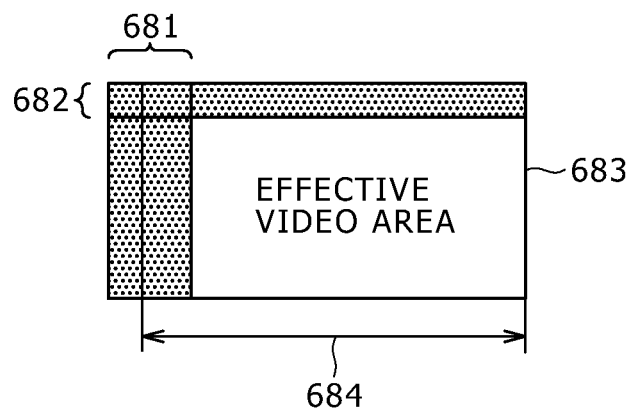
FIGS. 7A and 7B are schematic views showing typical data structures of a transmission stream for use by the second embodiment.
Figure 7B:
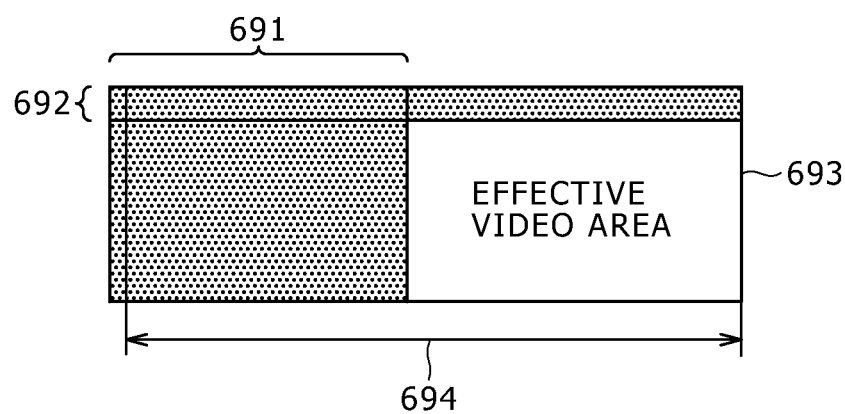

FIGS. 7A and 7B are schematic views showing typical data structures of the transmission stream for use by the second embodiment of this disclosure.

FIG. 7A shows the data structure of a single frame in the transmission stream in effect when the transmission clock speed determination block 630 determines that the estimated jitter amount is equal to or smaller than the tolerable jitter amount so that the transmission clock 30 times as fast as the video clock (standard scaling factor) is generated. As shown in FIG. 7A, one frame of the transmission stream is made up of blanking intervals (horizontal blanking interval 681 and vertical blanking interval 682) and single-frame video data (effective video area 683).

FIG. 7A schematically shows the size of a single frame (data amount) in which the amount of jitter falls within the tolerable jitter amount when the audio clock is generated from the transmission clock. If the total sum of a horizontal blanking interval 681, a vertical blanking interval 682, and an effective video area 683 becomes smaller than the size indicated by arrow 684, the estimated jitter amount becomes larger than the tolerable jitter amount.

FIG. 7B shows the data structure of a single frame in the transmission stream in effect when the transmission clock speed determination block 630 determines that the estimated jitter amount is larger than the tolerable jitter amount and sets the scaling factor of the transmission clock in a manner making the estimated jitter amount fall within the tolerable jitter amount. In FIG. 7B, as in FIG. 7A, blanking intervals (horizontal blanking interval 691 and vertical blanking interval 692) and single-frame video data (effective video area 693) are indicated. Arrow 694 indicates the size of a single frame (data amount) in which the amount of jitter produced when the audio clock is generated from the transmission clock falls within the tolerable jitter amount. The size indicated by arrow 694 is larger (wider) than the size indicated by arrow 684 in FIG. 7A. In the case of FIG. 7B, if the total sum of the horizontal blanking interval 681, vertical blanking interval 682, and effective video area 683 becomes smaller than the data amount indicated by arrow 694, the estimated jitter amount becomes larger than the tolerable jitter amount.

For example, if the transmission clock speed determination block 630 determines that the estimated jitter amount is larger than the tolerable jitter amount, the scaling factor of the transmission clock is calculated in such a manner as to make the estimated jitter amount equal to or smaller than the tolerable jitter amount. The size of the blanking intervals per frame is then adjusted to transmit data using the calculated transmission clock, as shown in FIG. 7B. That is, if the estimated jitter amount is determined to be larger than the tolerable jitter amount, the data structure is made such that the size of the blanking intervals per frame becomes larger than the size in effect when the standard scaling factor is applied.

As explained above, when the transmission clock speed determination block 630 determines that the estimated jitter amount is larger than the tolerable jitter amount, the size of blanking intervals is adjusted in such a manner as to have the transmission stream generated in synchronism with the transmission clock of which the estimated jitter amount falls within the tolerable jitter amount. Since the size of the effective video area remains unchanged, the faster the transmission clock (the larger the scaling factor for amplification), the higher the rate of blanking intervals per frame.

[Typical Operation of the Source Device Upon Transmission of the Transmission Stream]

Explained next in reference to the accompanying drawings is how the source device 610 of the second embodiment of the present disclosure typically operates when transmitting the transmission stream.

Figure 8:
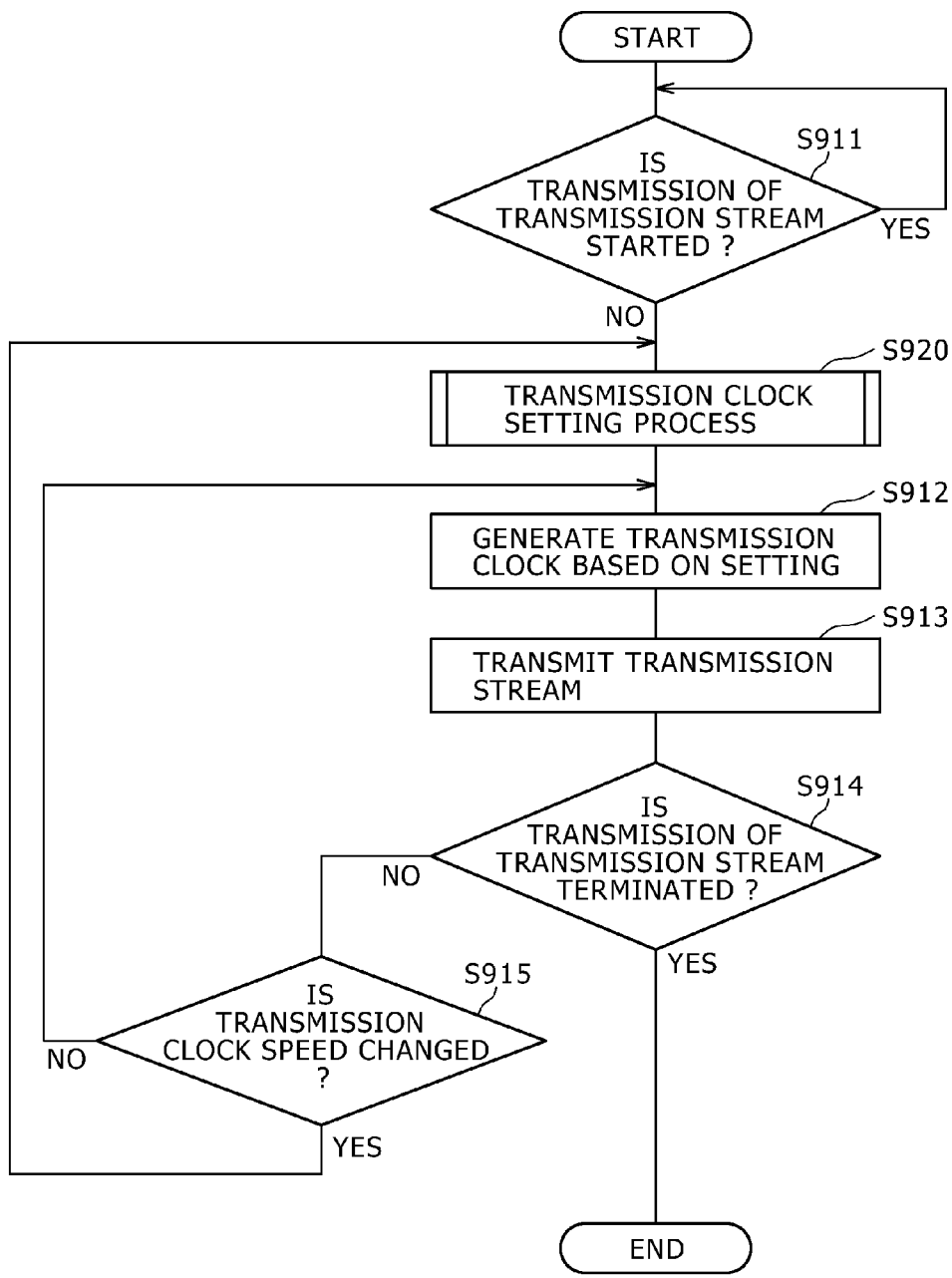
FIG. 8 is a flowchart showing a typical procedure by which a source device of the second embodiment transmits the transmission stream.

FIG. 8 is a flowchart showing a typical procedure by which the source device 610 of the second embodiment of the present disclosure transmits the transmission stream.

First, it is determined whether or not to start transmitting the transmission stream (step S911). If it is determined not to start the transmission of the transmission stream, the source device 610 waits for the determination to be made to start transmitting the transmission stream.

If it is determined to start the transmission of the transmission stream (step S911), the transmission clock speed determination block 630 carries out a transmission clock setting process (step S920) in which the speed of the transmission clock (scaling factor for the video clock) is determined. The transmission clock setting process (step S920) will be discussed later in reference to FIG. 9 and thus will not be explained here.

When the speed of the transmission clock is set, the transmission clock generation block (PLL) 620 generates the transmission clock at the set speed (step S912). The transmission stream is transmitted in synchronism with the transmission clock thus generated (step S913).

It is then determined whether or not to terminate the transmission of the transmission stream (step S914). If it is determined to terminate the transmission of the transmission stream (e.g., when there is no more data to be transmitted), then the process of transmitting the transmission stream is brought to an end.

If it is determined not to terminate the transmission of the transmission stream (step S914), the transmission clock speed determination block 630 determines whether or not to change the transmission clock speed (step S915). If it is determined in step S915 that the transmission clock speed needs to be changed (i.e., when at least either the audio clock or the video clock has had its speed changed), step S920 is reached again and the transmission clock speed is set again.

If it is determined in step S915 that the transmission clock speed does not need to be changed (e.g., when neither the audio clock nor the video clock has had its speed changed), step S912 is reached again.

FIG. 9 is a flowchart showing the typical procedure of the transmission clock setting process (step S920) performed by the transmission clock speed determination block 630 of the second embodiment of the present disclosure.

The transmission clock speed determination block 630 first acquires tolerable jitter information supplied from the tolerable jitter information supply block 640 (step S921). The speed of the audio clock is then acquired (step S922), followed by acquisition of the video clock speed (step S923).

Thereafter, the speed of the transmission clock (default speed) in effect when standard-size blanking intervals are added (transmission clock 30 times as fast as video clock) is calculated (step S924).

Based on the calculated default speed and on the audio clock speed, the transmission clock speed determination block 630 calculates the amount of jitter (estimated jitter amount) in effect when the audio clock generation block 400 of the sink device 650 regenerates (generates) the audio clock (step S925). Then it is determined whether or not the estimated jitter amount falls within the amount of jitter (tolerable jitter amount) indicated by the tolerable jitter information (step S926).

If the estimated jitter amount is determined to be smaller than the tolerable jitter amount (step S926), the transmission clock speed determination block 630 sets the standard scaling factor as the scaling factor by which the transmission clock generation block (PLL) 620 amplifies the clock (step S927). Then the transmission clock speed determination block 630 supplies information about the set scaling factor to the stream multiplexing block 150 (step S931). This step completes the transmission clock setting process.

On the other hand, if the estimated jitter amount is determined to be larger than the tolerable jitter amount (step S926), the transmission clock speed determination block 630 calculates the transmission clock speed (scaling factor calculation speed) in such a manner that the amount of jitter produced upon regeneration of the audio clock is equal to or smaller than the tolerable jitter amount (step S928). Based on the scaling factor calculation speed thus calculated, the transmission clock speed determination block 630 calculates the scaling factor (calculated scaling factor) for use by the transmission clock generation block (PLL) 620 (step S929). The transmission clock speed determination block 630 then sets the calculated scaling factor as the scaling factor by which the transmission clock generation block (PLL) 620 amplifies the clock (step S930). Thereafter, step S931 is reached.

According to the second embodiment of this disclosure explained above, the accuracy of the audio clock regenerated through division by the sink device is improved by suitably adjusting the size of blanking intervals in the transmission stream generated by the source device.

In the manner discussed above, it is easy to generate the clock according to the embodiments of the present disclosure.

Although it is assumed for the above embodiments of the present disclosure that the audio clock is regenerated through division, what is regenerated is not limited to the audio clock. Alternatively, the disclosure may be applied to a clock which differs in cycle from the transmission clock and which is regenerated from the transmission clock based on information indicative of the frequency relationship between the two clocks.

For the above embodiments of the present disclosure, the CTS value was shown calculated from the relationship between the transmission clock and 1/N audio clock. Alternatively, the CTS value may be calculated from the relationship between the video clock and 1/N audio clock. In the latter case, the scaling factor (30 for the first embodiment) in effect between the video clock and the transmission clock may be used in the multiplication for calculating the CTS value, so that the resulting CTS value may be placed into the expression (2) above when the expression is computed.

In the above description of the embodiments of the present disclosure, the transmission clock was shown generated on the basis of the transmission stream. However, this is not limitative of this disclosure. The present disclosure can also be applied when the source device transmits the transmission clock.

The preferred embodiments described above are merely examples in which the present disclosure may be implemented. The particulars of the embodiments and their variations in the description of this specification correspond basically to the disclosed matters claimed in the appended claims. Likewise, the disclosed matters named in the appended claims correspond basically to the particulars with the same names in the description of the preferred embodiments. However, these embodiments and their variations and other examples of the present disclosure are not limitative thereof, and it should be understood by those skilled in the art that various modifications, combinations, sub-combinations and alterations may occur depending on design requirements and other factor in so far as they are within the scope of the appended claims or the equivalents thereof.

Also, the series of the steps and processes discussed above as part of the embodiments may also be construed as a method for carrying out such steps and processes, as a program for causing a computer to execute such a method, or as a recording medium that stores such a program. As the recording medium for storing the program, a hard disk, a CD (Compact Disc), an MD (MiniDisc), a DVD (Digital Versatile Disk), a memory card, or a Blu-ray Disc (registered trademark) may be adopted, among others.

The present disclosure may also be configured as follows:

(1) A data reception circuit including a clock generation block configured to divide a first clock based on clock information, the first clock being the clock of a transmission stream targeted to transmit video data between apparatuses, the clock information indicating a cyclical relationship between the first clock and a second clock serving as the clock of predetermined data, the clock generation block further outputting the divided clock as the second clock.

(2) The data reception circuit as described in paragraph (1) above, wherein the transmission stream has the video data, the predetermined data, and the clock information multiplexed therein, the transmission stream being transmitted in synchronism with the first clock generated by amplifying by a predetermined scaling factor a clock for the transfer of the video data within an apparatus for transmitting the transmission stream;

the data reception circuit further including a demultiplexing block configured to demultiplex the transmission stream having been transmitted into the video data, the predetermined data, and the clock information;

the clock generation block generating the second clock by dividing the first clock based on the demultiplexed clock information.

(3) The data reception circuit as described in paragraph (2) above, wherein the first clock is the clock for transmitting the transmission stream using fewer transmission paths than the paths for the transfer of the video data within the apparatus for transmitting the transmission stream.

(4) The data reception circuit as described in paragraph (3) above, wherein the first clock is the clock for transmitting the transmission stream using a single transmission path.

(5) The data reception circuit as described in paragraph (2) above, wherein the predetermined scaling factor is such as to make the amount of jitter included in the second clock smaller than a predetermined amount serving as a reference.

(6) The data reception circuit as described in any one of paragraphs (1) through (5) above, wherein
the clock information includes a CTS value and an N value, the CTS value indicating the clock number of the first clock corresponding to one clock cycle of the second clock having been divided into predetermined intervals, the N value indicating the predetermined interval, and the clock generation block generates the second clock by dividing the first clock based on the ratio between the CTS value and the N value.

(7) The data reception circuit as described in paragraph (1) through (6) above, wherein
the predetermined data is audio data, and
the second clock is the master clock of the audio data.

(8) The data reception circuit as described in paragraph (7) above, wherein the first clock has a frequency at least 20 times that of the master clock of the audio data.

(9) A data reception apparatus including:
a first clock generation block configured to generate a first clock as the clock of a transmission stream transmitted via a single transmission path from a transmission apparatus for transmitting video data to the data reception apparatus, the first clock being generated based on the transmission stream having been transmitted;

a demultiplexing block configured to demultiplex the transmission stream having been transmitted into the video data, predetermined data, and clock information indicating a cyclical relationship between the first clock and a second clock serving as the clock of the predetermined data; and a clock generation block configured to divide the generated first clock based on the demultiplexed clock information, before outputting the divided clock as the second clock.

(10) An information processing system including:
a data transmission apparatus configured to generate clock information indicating a cyclical relationship between a first clock as the clock of a transmission stream targeted to transmit video data between apparatuses, and a second clock serving as the clock of predetermined data, before transmitting the transmission stream having the video data, the predetermined data, and the clock information multiplexed therein; and a data reception apparatus configured to receive the transmission stream having been transmitted and demultiplex the received transmission stream into the video data, the predetermined data, and the clock information, the data reception apparatus further dividing the first clock based on the clock information so as to generate the second clock.

(11) The information processing system as described in paragraph (10) above, wherein the data transmission apparatus calculates a scaling factor such as to make the amount of jitter included in the second clock generated by the data reception apparatus smaller than a predetermined amount serving as a reference, the data transmission apparatus further generating the first clock by amplifying by the calculated scaling factor a clock for the transfer of the video data within the data transmission apparatus.

(12) The information processing system as described in paragraph (11) above, wherein the data transmission apparatus generates the transmission stream in such a manner that the rate of a blanking interval included in the transmission stream rises in proportion to an increase in the scaling factor.

(13) A data reception method including: dividing a first clock based on clock information, the first clock being the clock of a transmission stream targeted to transmit video data between apparatuses, the clock information indicating a cyclical relationship between the first clock and a second clock serving as the clock of predetermined data; and outputting the divided clock as the second clock.

The present disclosure contains subject matter related to that disclosed in Japanese Priority Patent Application JP 2012-051121 filed in the Japan Patent Office on Mar. 8, 2012, the entire content of which is hereby incorporated by reference.

What is claimed is:

1. A data reception circuit comprising,
a clock generation block configured to divide a first clock based on clock information, said first clock being the clock of a transmission stream targeted to transmit video data between apparatuses, said clock information indicating a cyclical relationship between said first clock and a second clock serving as the clock of predetermined data, said clock generation block further outputting the divided clock as said second clock,
wherein said transmission stream has said video data, said predetermined data, and said clock information multiplexed therein, said transmission stream being transmitted in synchronism with said first clock generated by amplifying by a predetermined scaling factor a clock for the transfer of said video data within an apparatus for transmitting said transmission stream;
said data reception circuit further comprising a demultiplexing block configured to demultiplex said transmission stream having been transmitted into said video data, said predetermined data, and said clock information;
said clock generation block generating said second clock by dividing said first clock based on the demultiplexed clock information.

2. The data reception circuit according to claim 1, wherein said first clock is the clock for transmitting said transmission stream using fewer transmission paths than the paths for the transfer of said video data within said apparatus for transmitting said transmission stream.

3. The data reception circuit according to claim 2, wherein said first clock is the clock for transmitting said transmission stream using a single transmission path.

4. The data reception circuit according to claim 1, wherein said predetermined scaling factor is such as to make the amount of jitter included in said second clock smaller than a predetermined amount serving as a reference.

5. The data reception circuit according to claim 1, wherein
said clock information includes a CTS value and an N value, said CTS value indicating the clock number of said first clock corresponding to one clock cycle of said second clock having been divided into predetermined intervals, said N value indicating the predetermined interval, and
said clock generation block generates said second clock by dividing said first clock based on the ratio between said CTS value and said N value.

6. The data reception circuit according to claim 1, wherein said predetermined data is audio data, and
said second clock is the master clock of said audio data.

7. The data reception circuit according to claim 6, wherein said first clock has a frequency at least 20 times that of said master clock of said audio data.

8. The data reception circuit according to claim 1, wherein the video data has a 24-bit stream rate.

9. A data reception apparatus comprising:
a first clock generation block configured to generate a first clock as the clock of a transmission stream transmitted via a single transmission path from a transmission apparatus for transmitting video data to said data reception apparatus, said first clock being generated based on said transmission stream having been transmitted;
a demultiplexing block configured to demultiplex said transmission stream having been transmitted into said video data, predetermined data, and clock information indicating a cyclical relationship between said first clock and a second clock serving as the clock of said predetermined data; and
a clock generation block configured to divide the generated first clock based on the demultiplexed clock information, before outputting the divided clock as said second clock.

10. An information processing system comprising:
a data transmission apparatus configured to generate clock information indicating a cyclical relationship between a first clock as the clock of a transmission stream targeted to transmit video data between apparatuses, and a second clock serving as the clock of predetermined data, before transmitting said transmission stream having said video data, said predetermined data, and said clock information multiplexed therein; and
a data reception apparatus configured to receive said transmission stream having been transmitted and demultiplex the received transmission stream into said video data, said predetermined data, and said clock information, said data reception apparatus further dividing said first clock based on said clock information so as to generate said second clock.

11. The information processing system according to claim 10, wherein said data transmission apparatus calculates a scaling factor such as to make the amount of jitter included in said second clock generated by said data reception apparatus smaller than a predetermined amount serving as a reference, said data transmission apparatus further generating said first clock by amplifying by the calculated scaling factor a clock for the transfer of said video data within said data transmission apparatus.

12. The information processing system according to claim 11, wherein said data transmission apparatus generates said transmission stream in such a manner that the rate of a blanking interval included in said transmission stream rises in proportion to an increase in said scaling factor.

13. A data reception method comprising,
dividing a first clock based on clock information, said first clock being the clock of a transmission stream targeted to transmit video data between apparatuses, said clock information indicating a cyclical relationship between said first clock and a second clock serving as the clock of predetermined data; and
outputting the divided clock as said second clock,
wherein said transmission stream has said video data, said predetermined data, and said clock information multiplexed therein, said transmission stream being transmitted in synchronism with said first clock generated by amplifying by a predetermined scaling factor a clock for the transfer of said video data within an apparatus for transmitting said transmission stream;
said data reception circuit further comprising a demultiplexing block configured to demultiplex said transmission stream having been transmitted into said video data, said predetermined data, and said clock information;
said clock generation block generating said second clock by dividing said first clock based on the demultiplexed clock information.

14. The data reception method according to claim 13, wherein said first clock is the clock for transmitting said transmission stream using fewer transmission paths than the paths for the transfer of said video data within said apparatus for transmitting said transmission stream.

15. The data reception method according to claim 14, wherein said first clock is the clock for transmitting said transmission stream using a single transmission path.

16. The data reception method according to claim 13, wherein said predetermined scaling factor is such as to make the amount of jitter included in said second clock smaller than a predetermined amount serving as a reference.

17. The data reception method according to claim 13, wherein
   said clock information includes a CTS value and an N value, said CTS value indicating the clock number of said first clock corresponding to one clock cycle of said second clock having been divided into predetermined intervals, said N value indicating the predetermined interval, and
   said clock generation block generates said second clock by dividing said first clock based on the ratio between said CTS value and said N value.

18. The data reception method according to claim 13, wherein
   said predetermined data is audio data, and
   said second clock is the master clock of said audio data.

19. The data reception method according to claim 18, wherein said first clock has a frequency at least 20 times that of said master clock of said audio data.

20. The data reception method according to claim 13, wherein the video data has a 24-bit stream rate.

* * * * *